(12) United States Patent
Hoshino

(10) Patent No.: US 6,833,838 B2
(45) Date of Patent: Dec. 21, 2004

(54) COLOR ADJUSTMENT METHOD, COLOR ADJUSTMENT METHOD IMPLEMENTATION PROGRAM AND PROGRAM STORAGE MEDIUM

(75) Inventor: Toru Hoshino, Tokyo (JP)

(73) Assignee: Konica Corporation, Tokyo (JP)

( * ) Notice: Subject to any disclaimer, the term of this patent is extended or adjusted under 35 U.S.C. 154(b) by 137 days.

(21) Appl. No.: 10/227,971

(22) Filed: Aug. 26, 2002

(65) Prior Publication Data

US 2003/0043167 A1 Mar. 6, 2003

(30) Foreign Application Priority Data

Aug. 31, 2001 (JP) ........................................ 2001-263316

(51) Int. Cl.[7] ................................................ G09G 5/02
(52) U.S. Cl. ...................... 345/600; 345/428; 345/589; 345/604
(58) Field of Search ................................ 345/428, 589, 345/600, 604

(56) References Cited

U.S. PATENT DOCUMENTS 6,384,895 B1 * 5/2002 Sawano ........................ 355/40

* cited by examiner

Primary Examiner—Matthew C. Bella
Assistant Examiner—Tam Tran
(74) Attorney, Agent, or Firm—Frishauf, Holtz, Goodman & Chick, P.C.

(57) ABSTRACT

A color adjustment method having the steps of: generating a gradation correction curve for each color in such a way that the values of four colors, CMYK or three colors, CMY to be input into the first color image output apparatus are input values for the correction curve, while the values of four colors, CMYK or three colors, CMY to be input into the second color image output apparatus are output values for the correction curve; and performing conversion of C, M, Y and K values by the gradation correction curve so that the second color image output apparatus reproduce colors of the first color image output apparatus;

wherein, the correction curve is generated based on a first color chart from the first color image output apparatus and a second color chart from the second color image output apparatus.

3 Claims, 14 Drawing Sheets

GRADATION CORRECTION CURVE FOR "C"

GRADATION CORRECTION CURVE FOR "M"

GRADATION CORRECTION CURVE FOR "Y"

"M, C" COORDINATE SYSTEM

COLOR SYSTEM EXPRESSING LIGHTNESS AND CHROMA

COLOR ADJUSTMENT METHOD, COLOR ADJUSTMENT METHOD IMPLEMENTATION PROGRAM AND PROGRAM STORAGE MEDIUM

BACKGROUND OF THE INVENTION

The present invention relates to a color adjustment method, an color adjustment method implementation program and a program storage medium for generating a gradation correction curve representing the relationship of cyan C, magenta M, yellow Y and black K between two image output apparatuses, a printing machine and a color proof printer, based on the colorimetry of a color chart, and for reproducing the colors of the printed matter outputted from a printer by a color proof printer using the aforementioned gradation correction curve.

In a prior art dot type color proof printer, the colors of C, M, Y and K coloring materials are close to ink colors of printing machine, so correction (gain dot curve correction) of the difference in the dot size for each of C, M, Y and K is carried out based on the result of measuring the dot percentage, whereby colors can be matched to a printing machine to a certain extent.

Further, the gradation correction curve of each color is generated based on the output of each single color, and colors can be matched to the printing machine to a certain extent using the aforementioned gradation correction curve, according to the prior art.

However, although reproducibility of each color can be ensured by the gradation correction curve generated by the output of each of colors C, M, Y and K, the gray color produced by overlaying of three colors, C, M and Y may not be satisfactory in some cases. It looks reddish or greenish, and the color tones of the entire image are not matched correctly, according to the prior art.

The present invention is intended to solve the aforementioned problems. The object is to provide a color adjustment method for matching the gray composed of a combination of C, M and Y, and color tones of the entire image when the output of a color proof printer is matched to the output of a printing machine.

SUMMARY OF THE INVENTION

The present invention uses the following means to solve the aforementioned problems:

A first color adjustment method (1) is characterized in that,
  in a first color image output apparatus as a target of color matching and a second color image output apparatus for reproducing that color,
  a gradation correction curve is generated for each color in such a way that the values for four colors, cyan C, magenta M, yellow Y and black K or three color, C, M and Y to be input into the aforementioned first color image output apparatus are input values for the gradation correction curve, while the values for four colors, C, M, Y and K or three color, C, M and Y to be input into the aforementioned second color image output apparatus are output values for the gradation correction curve; and
  conversion of C, M, Y and K is performed for image data by the aforementioned gradation correction curve so that the output matched to the color of the first color image output apparatus can be obtained by the aforementioned second color image output apparatus;
said color adjusting method further characterized in that the aforementioned gradation correction curve is generated based on the first color chart outputted from the aforementioned first color image output apparatus and the second color chart outputted from the aforementioned second color image output apparatus.

A second color adjustment method (2) is characterized in that said first color chart and second color chart contain the colors outputted by overprinting of fundamental colors.

A third color adjustment method (3) is characterized in that said first color chart contains at least one or two gray colors outputted by overprinting of three fundamental colors, C, M and Y, in equal amounts.

A fourth color adjustment method (4) is a program for implementing on a computer the color adjustment method according any one of the aforementioned first to third color adjustment methods.

A fifth color adjustment method (5) is characterized by comprising a computer readable memory medium for storing the program according to the aforementioned fourth method.

DETAILED DESCRIPTION OF THE PREFERRED EMBODIMENT

Figure 17:
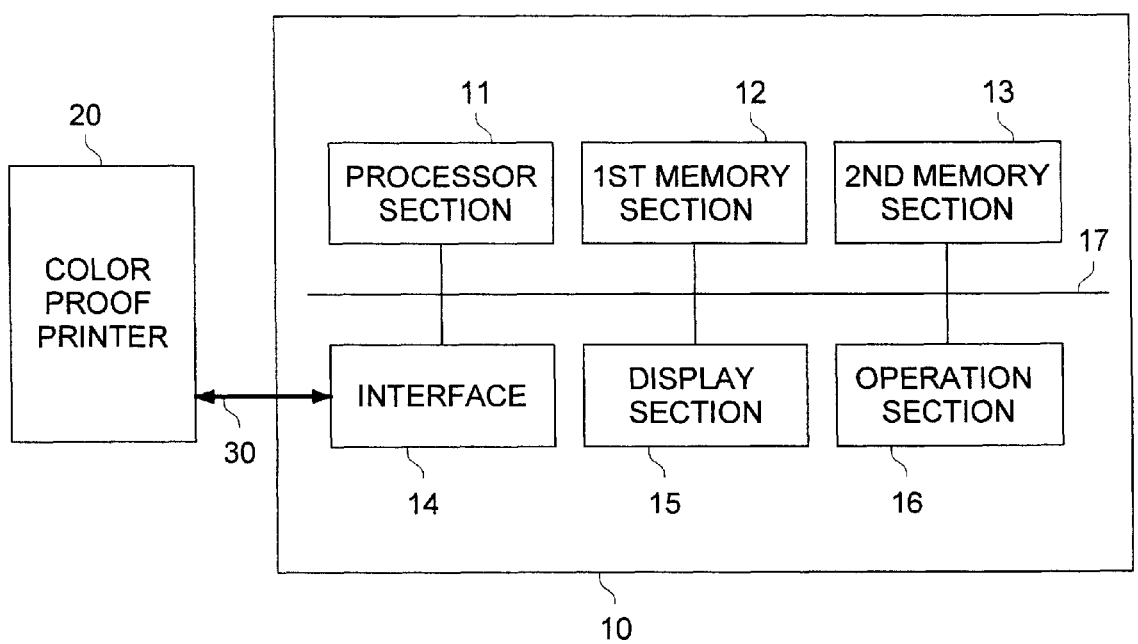
FIG. 17 is a diagram representing an example of the configuration of the apparatus in the present embodiment.

The following describes the preferred embodiments of the present invention with reference to FIGS. 1 to 17:

FIG. 17 shows an example of the configuration for implementing color adjustment according to the present invention. As given in FIG. 17, this embodiment comprises a personal computer 10 and a color proof printer 20. The personal computer 10 further comprises a processor section 11 consisting of a microprocessor, a first memory section 12 consisting of a memory, a second memory section 13 consisting of hardware, an interface 14 as communication means with the outside, a display section 15 consisting of a display, an operation section 16 consisting of a board, an internal bus 17 for enabling communications among them. Further, the personal computer 10 and color printer are connected by a bus 30 for permitting transfer of image, information and others.

Further, the gradation correction curves to be discussed later is stored in the secondary memory section 13 as a lookup table, and works in such a way that color conversion of the image data is performed before a color image is outputted by a color proof printer 20 using a printer driver.

Figure 1:
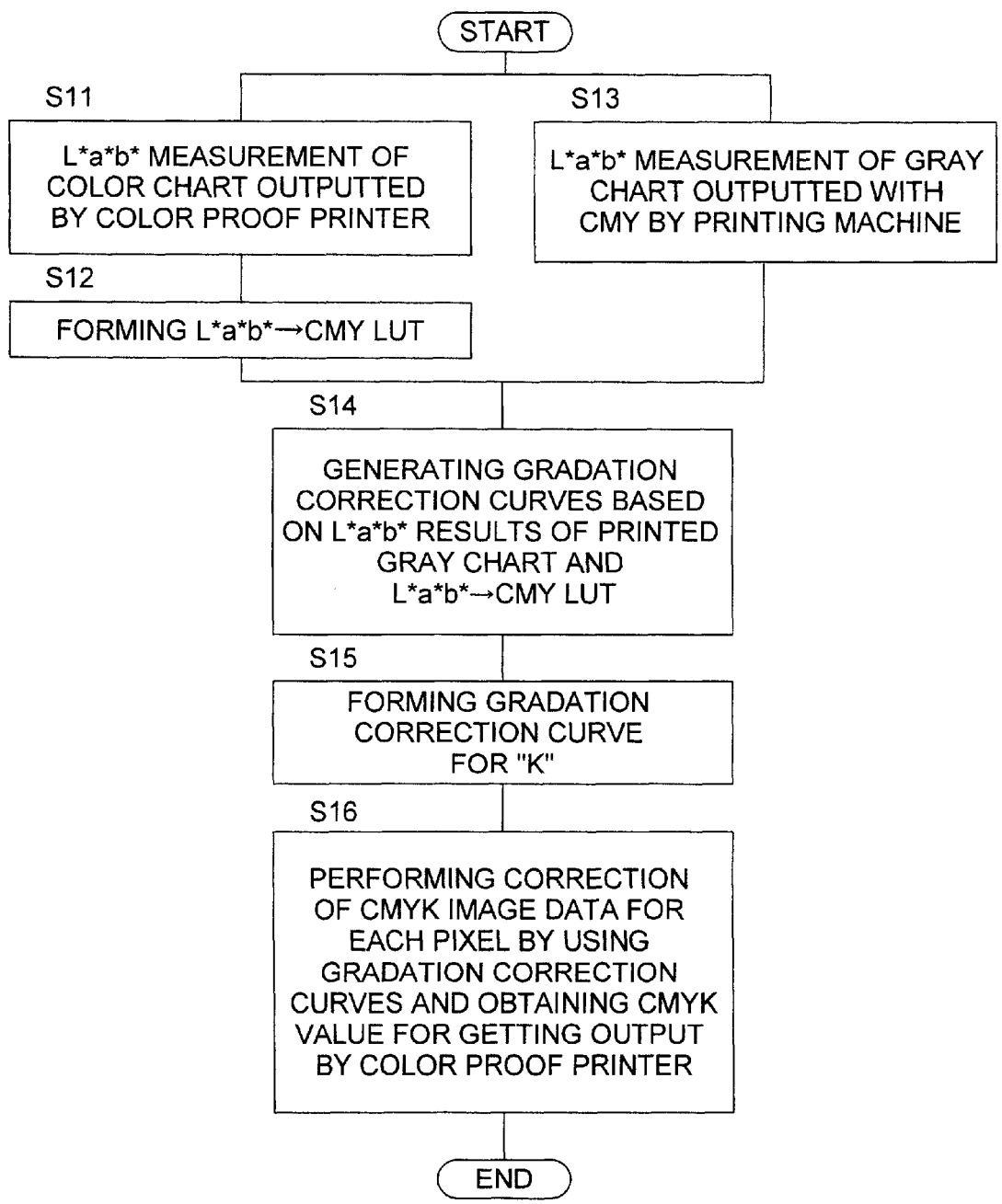
FIG. 1 is a flow chart representing the procedure of a color adjustment method for a printing machine and a color proof printer using the gradation correction curve as an embodiment of the present invention.

FIG. 1 is a flow chart showing each step of the color adjustment method as an embodiment of the present invention. This color adjustment method is implemented in such a way that the color of the printing machine is reproduced by the color proof printer (second color image output apparatus) where the printing machine (1st color image output apparatus) is used as a target for color matching.

First, the following describes the overview of each step in the color adjustment method as the present embodiment with reference to FIG. 1:

A lookup table is generated (S12) based on the result of L*a*b* values of the color chart outputted by a color proof printer (S11). L*a*b* values of gray chart outputted in terms of C, M and Y by a printing machine are measured (S13). Then a gradation correction curves for C, M and Y are generated from the result of L*a*b* values of the outputted gray chart and the lookup table of the color proof printer (S14). Further, a gradation correction curve for K is created (S15).

Then C, M, Y and K image data is corrected for each pixel using gradation correction curves to get the C, M, Y and K values to be outputted by color proof printer. These values are outputted from the color proof printer (S16).

The following describes the aforementioned lookup table and generation method with reference to FIGS. 2 to 14.

The aforementioned color proof lookup table (hereinafter referred to as "LUT") uses the following two LUTs:

CMY→L*a*b*LUT

L*a*b*→CMY LUT

The CMY→L*a*b*LUT coverts the value of C, M and Y image data into the values L*a*b* in color system. L*a*b*→CMY LUT converts the values L*a*b* in color system into the values of C, M and Y colors.

(Steps S11 and S12)

Figure 2:
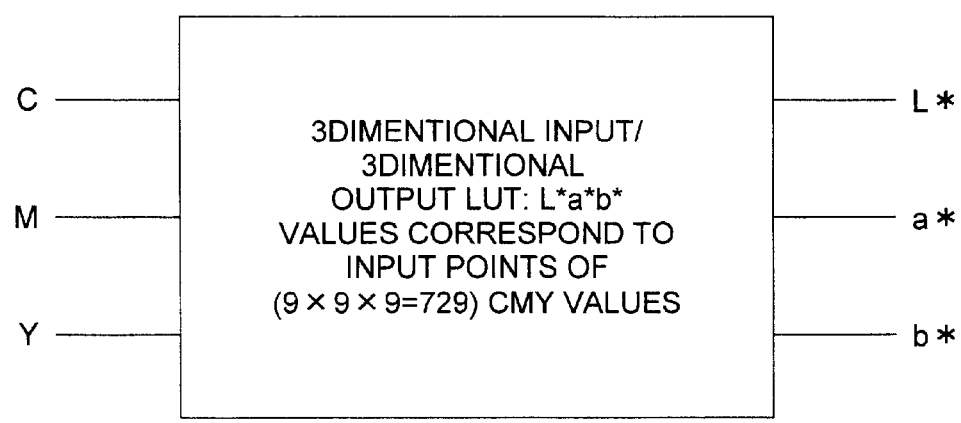
FIG. 2 is an explanatory diagram representing the LUT for converting the values of C, M and Y colors into values L*a*b* in color system.
Figure 3:
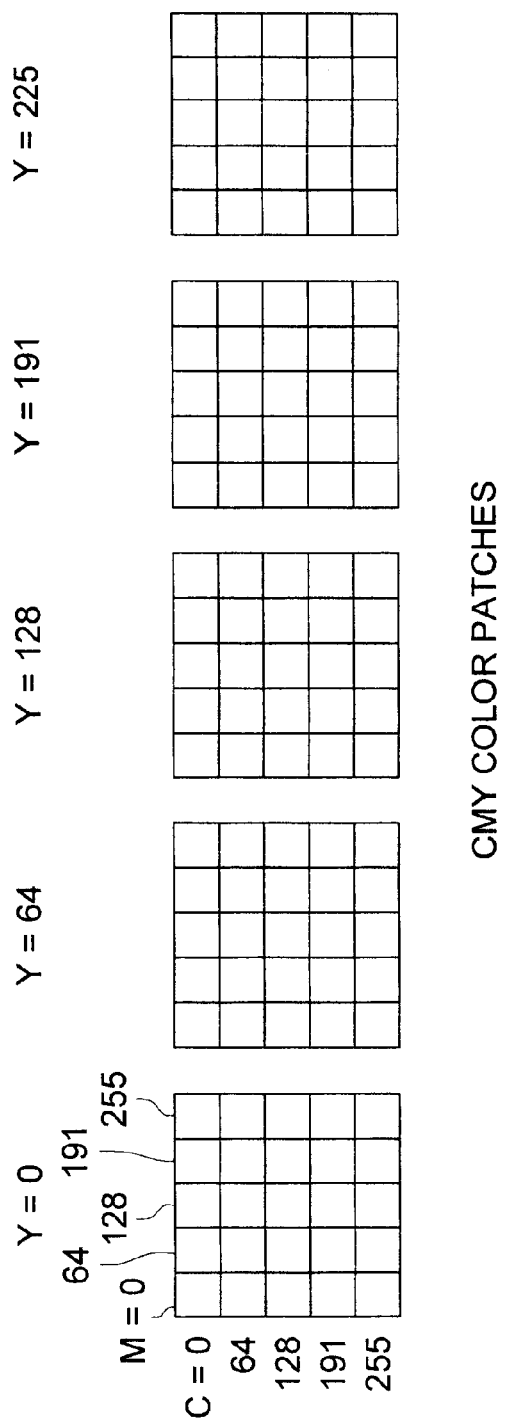
FIG. 3 is a diagram representing an example of a color patch image for measuring the L*a*b* values for the C, M and Y colors according to the present embodiment.

CMY→L*a*b*LUT is as shown in FIG. 2, for example. It represents the three dimensional input/three dimensional output where the value L*a*b* is placed with respect to the CMY LUT input points. To put it specifically, it is necessary to measure the color patches by a calorimeter for a great number of combinations to convert the entire CMK color space, and value L*a*b* of each color patch is obtained to generate a LUT. For example, the following method with interpolation technique is used for making the LUT.

The image data of each of C, M and Y from the minimum value 0 to 255 is divided into four parts, and fives levels of 0, 64, 128, 191 and 255 are picked up. The color chart of FIG. 3 where a color patch is arranged for a combination of C×M×Y: 5×5×5=125 points is printed by the color proof printer, and each patch of 5×5×5=125 points is measured sequentially to determine the value L*a*b*.

Figure 4:
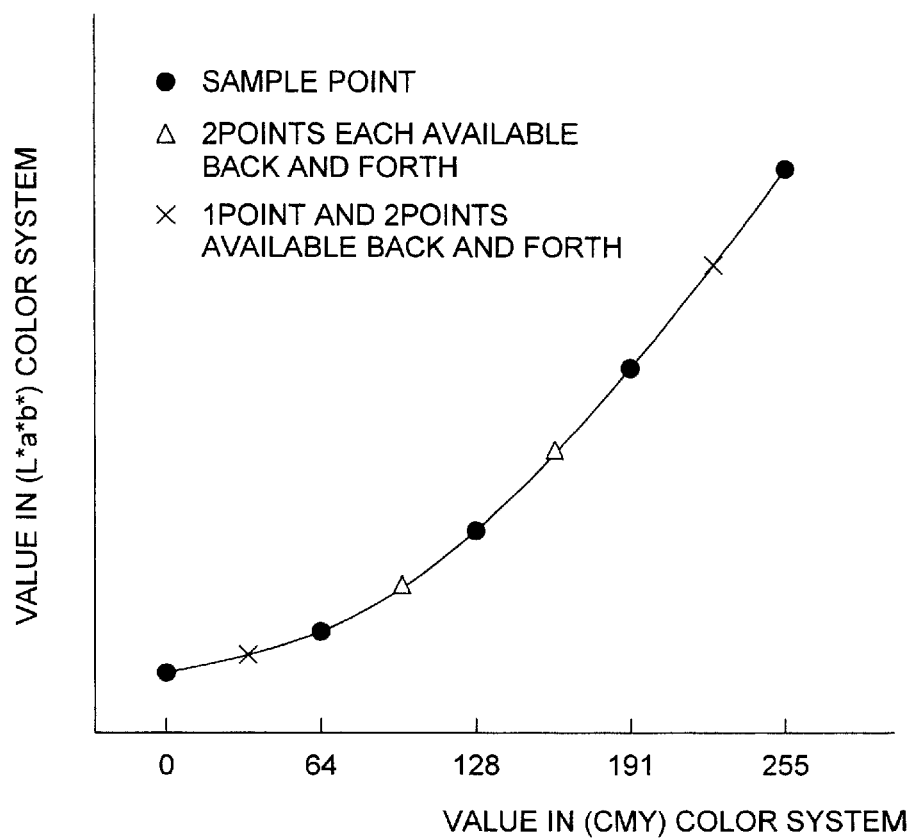
FIG. 4 is a diagram representing interpolation of the sample points on a locus based on the values for C, M and Y colors and L*a*b* values of color system according to the present embodiment.

Further, the three dimensional input/three-dimensional output LUT is interpolated from 5×5×5=125 points into 9×9×9 points among grid points of 9×9×9. As shown in FIG. 4, a centered dot (●) is assumed as a grid point (sample points), and a triangle (Δ) and a cross (X) are assumed as point to be interpolated. Then different interpolation formulas are obtained between the case where two grid points are present on each of the front and back, and the case where one and three points are present on the front and back.

The color system of the points to be interpolated is assumed as Lm*am*bm*, and the color system of each sample point to be Li*ai*bi* (where i=1 to 4). In the former case (Δ), interpolation is performed according to the following interpolation formulas:

$Lm*=-(1/16)L1*+(9/16)L2*+(9/16)L3*-(1/16)L4*$ $am*=-(1/16)a1*+(9/16)a2*+(9/16)a3*-(1/16)a4*$ $bm*=-(1/16)b1*+(9/16)b2*+(9/16)b3*-(1/16)b4*$

In the case of the latter (X), the following formulas are used for interpolation:

$Lm*=(5/16)L1*+(15/16)L2*-(5/16)L3*+(1/16)L4*$ $am*=(5/16)a1*+(15/16)a2*-(5/16)a3*+(1/16)a4*$ $bm*=(5/16)b1*+(15/16)b2*-(5/16)b3*+(1/16)b4*$

Figure 5:
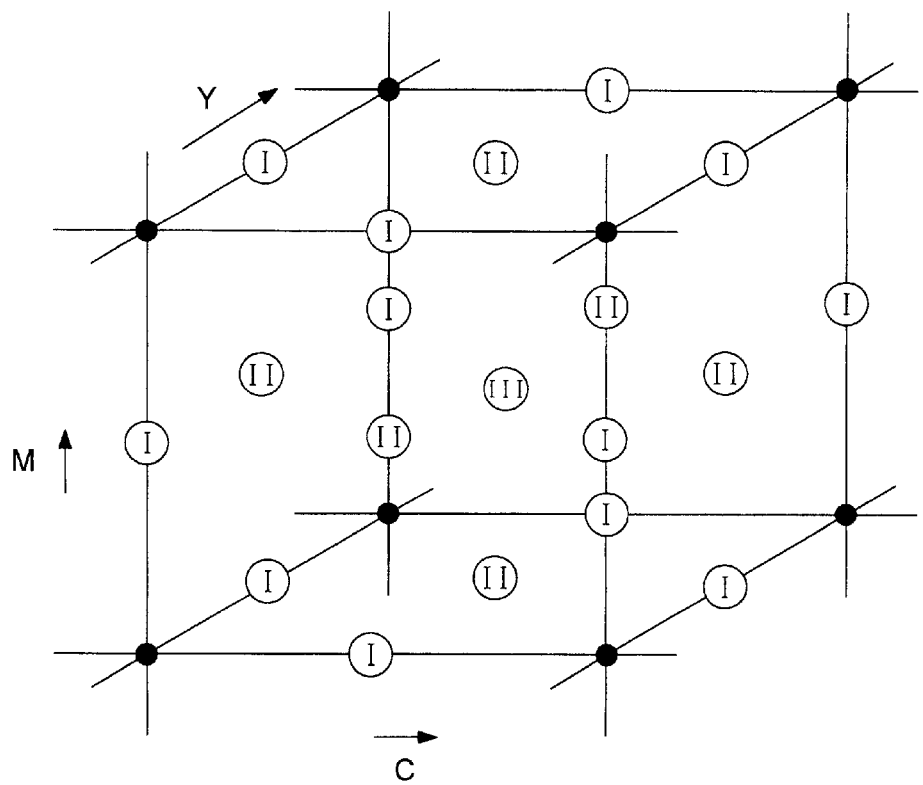
FIG. 5 is a diagram representing the sequence of interpolations in converting the combinations of C, M and Y colors into the L*a*b* values in color system according to the present embodiment.

FIG. 5 shows an example of the sequence of CMY three-dimensional interpolation procedures. Interpolation is performed in the sequence of numerals ①, ② and ③ in FIG. 5 (each corresponding to the Roman letters in FIG. 5) denote, thereby interpolating CMY 5×5×5 to 9×9×9. This allows the value L*a*b* for CMY combinations to be obtained by extension to 9×9×9=729 points although only the patches at 5×5×5=125 points are measured.

Figure 6:
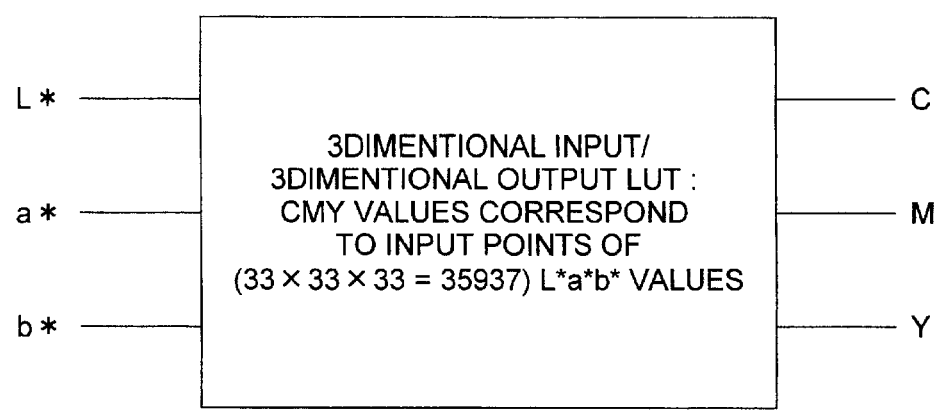
FIG. 6 is an explanatory diagram representing the LUT for converting L*a*b* values in color system into the values for C, M and Y colors according to the present embodiment.

In the meantime, L*a*b*→CMY LUT is a three-dimensional input/three-dimensional output LUT as shown in FIG. 6, and conversion is carried out by interpolation for points among grid points of 33×33×33.

The following describes how to obtain the three-dimensional input/three-dimensional output LUT of FIG. 6.

For simplicity, two fundamental colors, C and M, are used in the description. C, M and Y are assumed to take values from 0 to 255.

Figure 8:
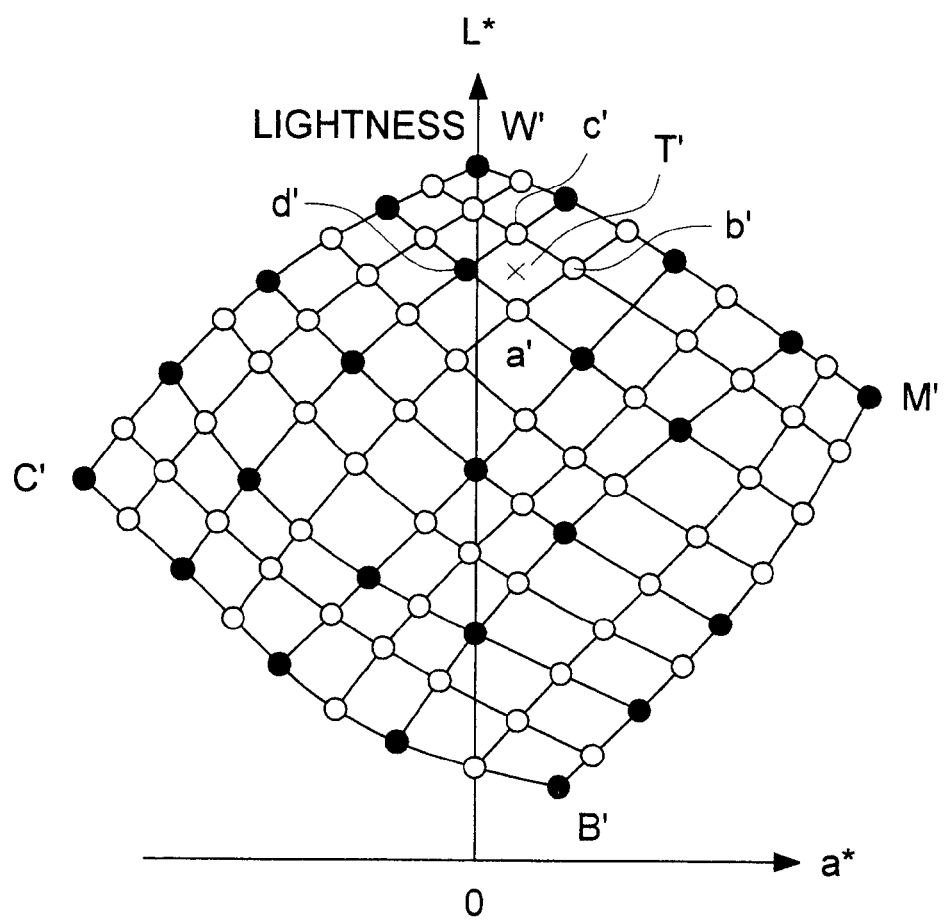
FIG. 8 is a coordinate diagram representing the target value T' in the coordinate of C and M color system according to the present embodiment.

First, L*a*b*→CMY LUT will be calculated using the three-dimensional data of C×M×Y: 9×9×9 of CMY→L*a*b* LUT. FIG. 8 shows a two-dimensional combination of 9×9 (where Y=0) of M and C wherein L* is plotted on the vertical axis, and a* is plotted on the horizontal axis. Actually, three dimensions are actually used, but two dimensions are used in the description for the sake of simplicity.

Figure 9:
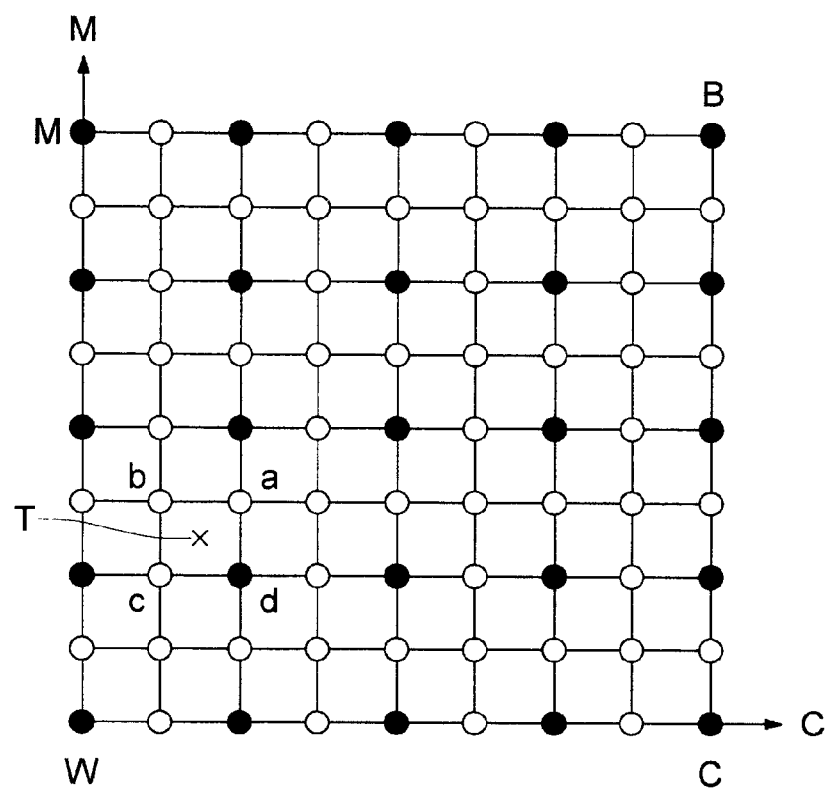
FIG. 9 is a coordinate diagram representing the target value T in the coordinate of C and M color combinations according to the present embodiment.

L*a*b* at the target point [each LUT input point of L* (0 to 100) a* (−127 to 128) b* (−127 to 128): 33×33×33= 35937] is given as a target value T'. When the target T' is found in the area enclosed by the grid points a' to d' as shown in FIG. 8, the M and C combination (target value T) in the M and C coordinate system is assumed to be located within the area enclosed by grid points a to d as shown in FIG. 9. The exact position of the target value T within the area enclosed by grid points a to d is obtained by convergence processing by corresponding the color system in FIG. 8 with the coordinate system of FIG. 9. The reason for the use of convergence processing is that, although conversion from the coordinate system of FIG. 9 to the color system of FIG. 8 is known, the reverse conversion is very complicated and effective conversion formula is not yet known.

Figure 10:
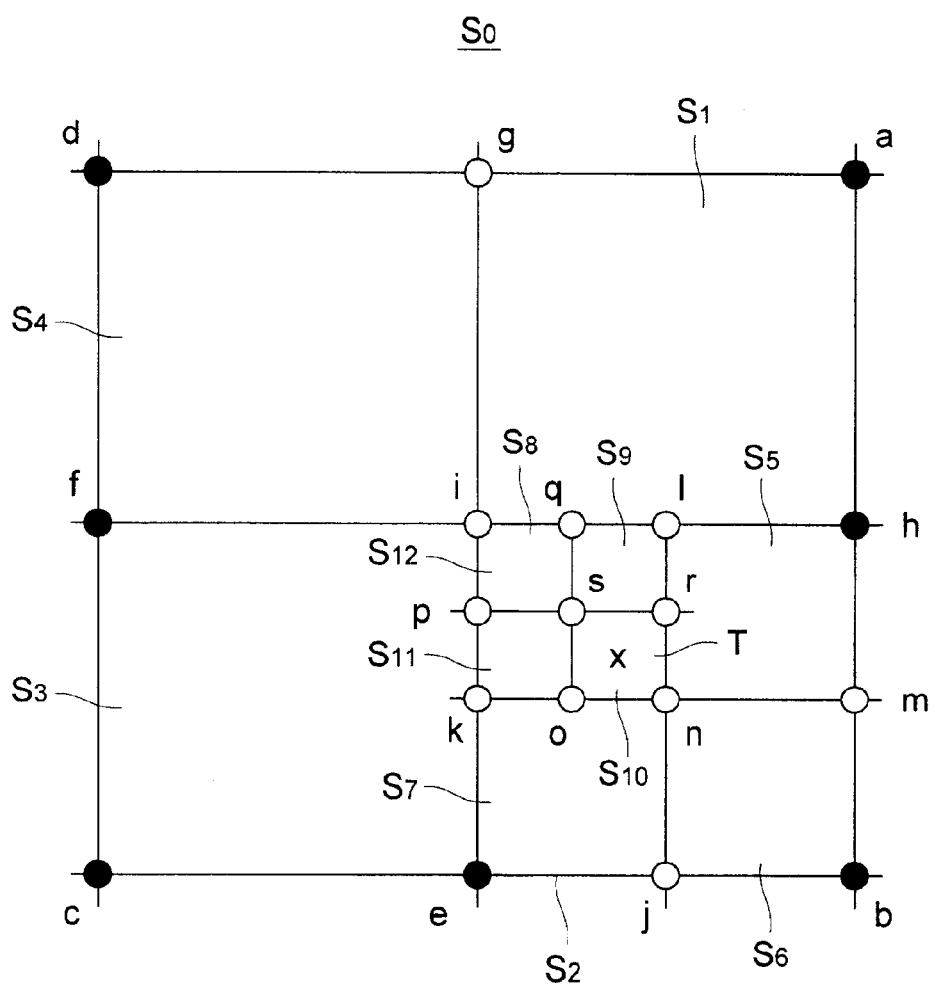
FIG. 10 is a coordinate diagram representing convergence processing procedure for estimating the target value T in the coordinate of C and M color combinations according to the present embodiment.
Figure 11:
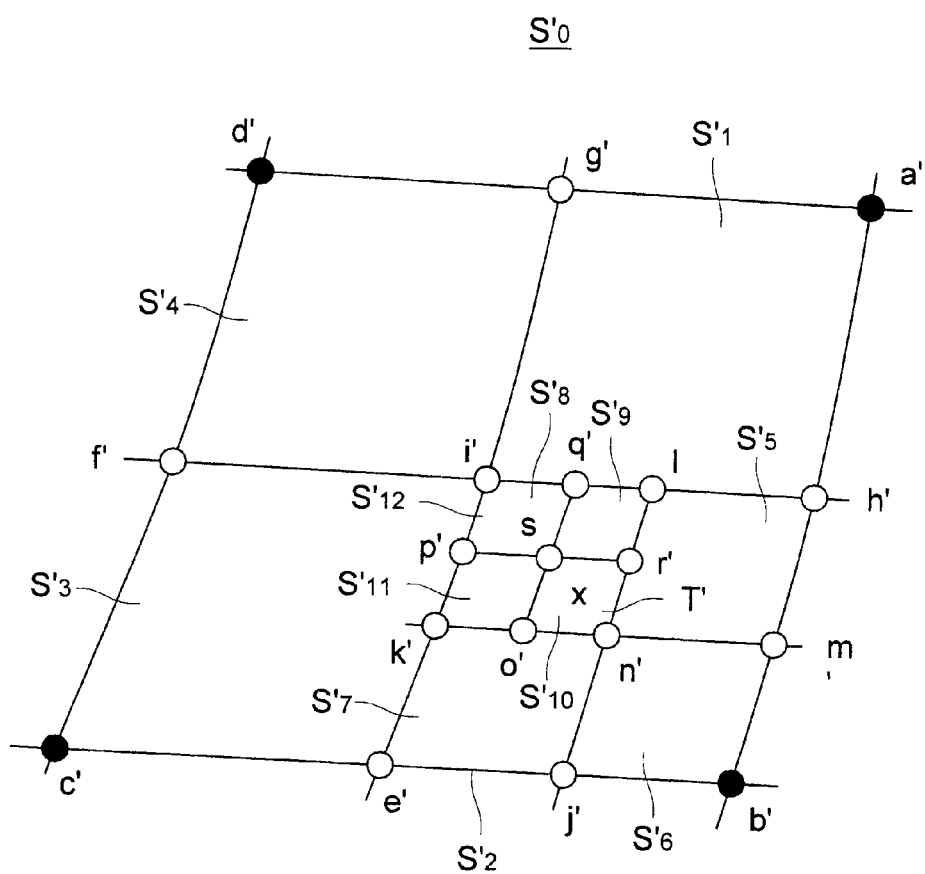
FIG. 11 is a coordinate diagram representing convergence processing procedure for estimating the target value T' in the coordinate of C and M color system according to the present embodiment.

In the following description the area S0 formed by grid points a to d in FIG. 10 is equally divided into four areas S1 to S4. Five division points e to i are obtained by weighted average using the grid points around the ones already obtained. The values obtained by converting the values corresponding to these division points e to i into the values in the L*a*b* color system are plotted on the color system of FIG. 11, to find out the area where the target T' is located, by checking the four areas S1' to S4' formed by the plotted division points e' to i'. If it is located in area S2' as shown in FIG. 11, the target value T' is assumed to be located in S2 corresponding to the area S2' as shown in FIG. 10.

The estimated area S2 is equally divided into S5 to S8. Five division points j to n are calculated by the weighted average using the surrounding grid points or division points already obtained. The values obtained by converting the values corresponding to these divisions points j to n into L*a*b* in color system are plotted on the color system given in FIG. 11, to find out the area where the target value T' is present by checking the four areas S5' to S8' formed by plotted division points j' to n'. If it is located in area S8' as shown in FIG. 11, the target value T' is estimated to be present in area S8 corresponding to area S8', as shown in FIG. 10.

Then the estimated area S8 is equally divided into four areas S9 to S12. Five division points o to s are calculated by weighted average using the surrounding grid points or division points already obtained. The values obtained by converting the values corresponding to these divisions points o to s into L*a*b* in color system are plotted on the color system given in FIG. 11, to find out the area where the target value T' is present by checking the four areas S9' to S12' formed by plotted division points o' to s'. If it is located in area S10' as shown in 11, the target value T is estimated to be present in area S10 corresponding to area S10', as shown in FIG. 10.

Grids are gradually reduced in size by repeating the division of areas as described above, and are converged finally. The target value T is obtained by averaging the four division points forming the converged area, and this makes it possible to find out a combination of fundamental colors showing the output color to be obtained.

The aforementioned convergence processing method is used in the present embodiment, but it is also possible to use the method of interpolation disclosed in the specifications of the Japanese Patent No.2895086 of the present applicant.

Figure 12:
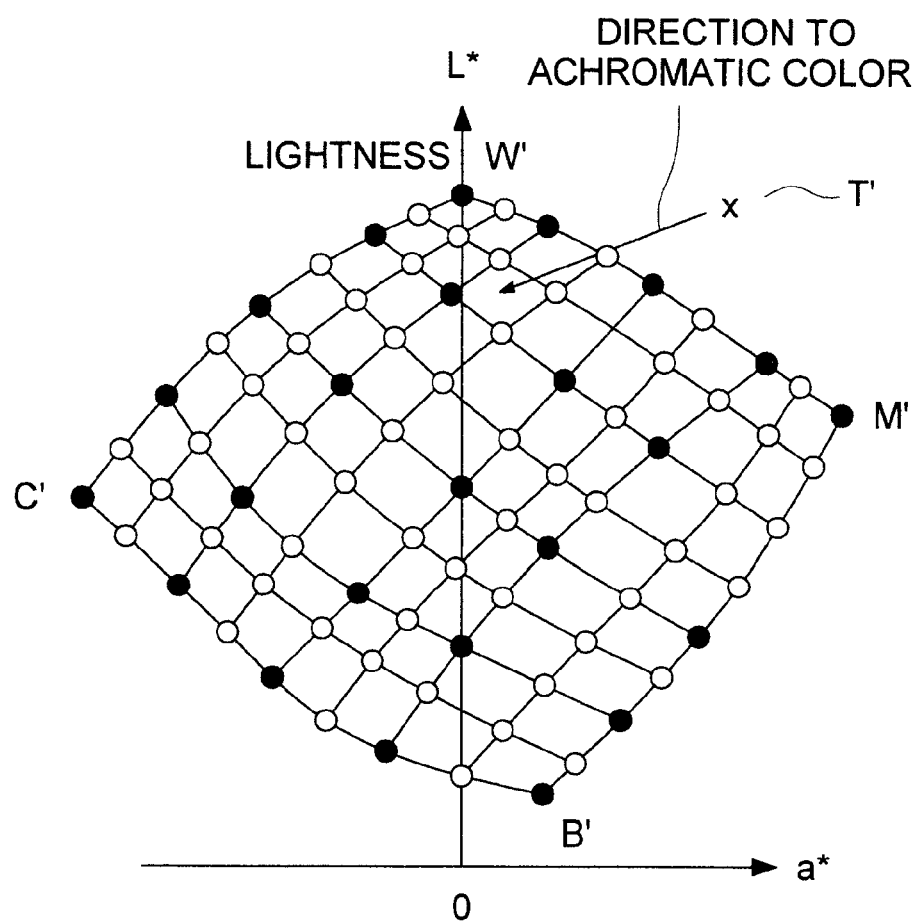
FIG. 12 is a diagram representing the target value T' in the coordinate of C and M color system according to the present embodiment wherein target value T' is outside the scope of color reproduction.
Figure 13:
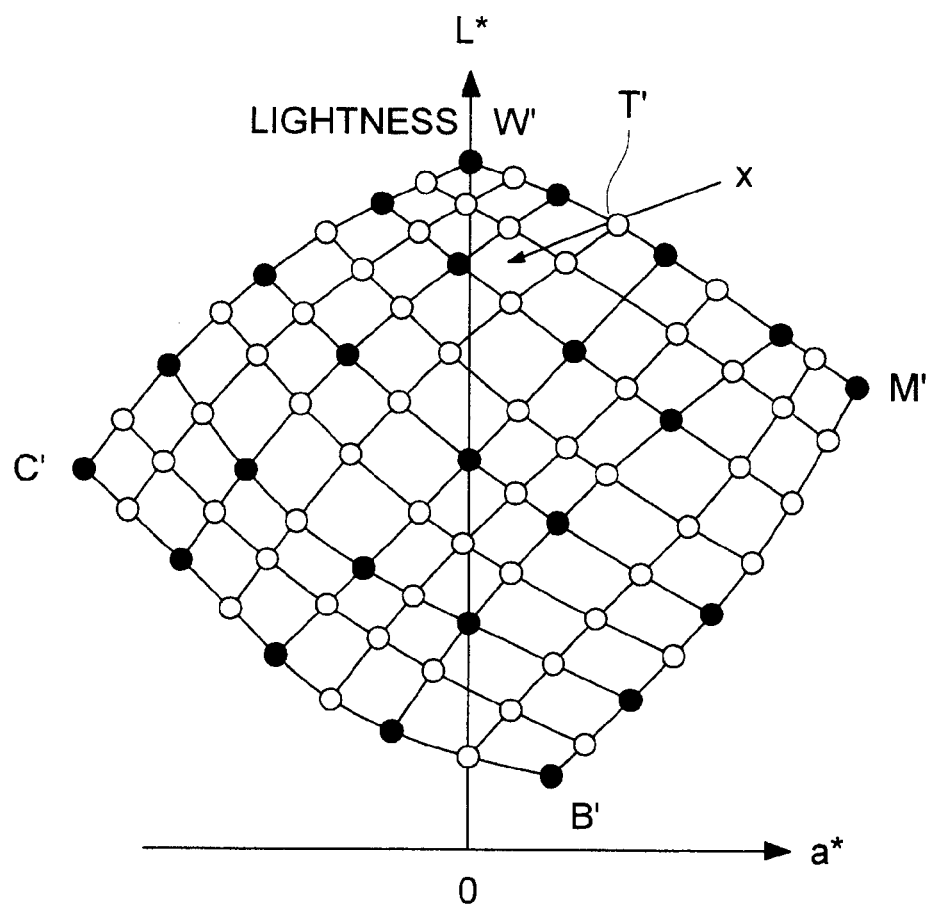
FIG. 13 is a coordinate diagram representing the target value T' in the coordinate of C and M color system according to the present embodiment wherein target value T' is outside the scope of color reproduction; this coordinate diagram showing that the target value T' has been moved into the scope of reproduction.
Figure 14:
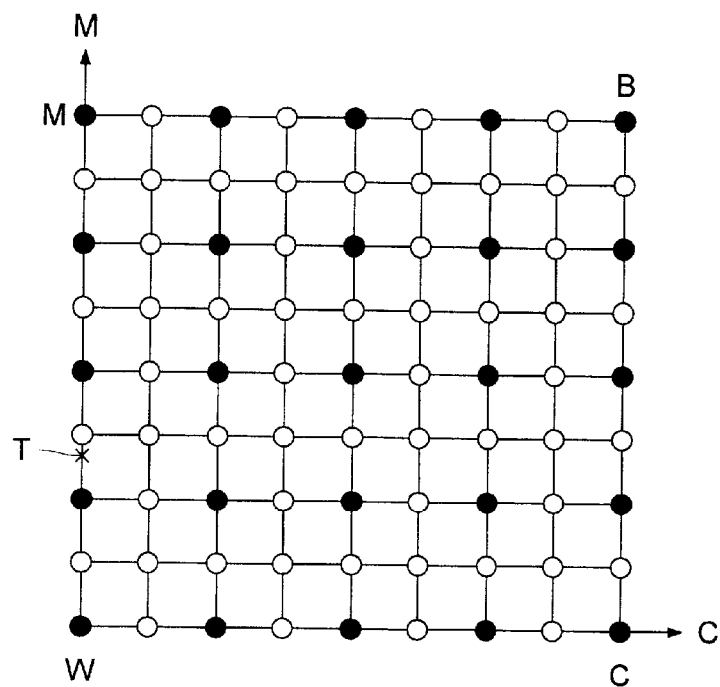
FIG. 14 is a diagram representing the target value T in the coordinate of C and M color combinations according to the present embodiment when the target value T' outside the scope of color reproduction is brought in the scope of color reproduction.

Incidentally, when the target value T' is located outside the range of color reproduction formed by apexes W', C', M' and B' of the L*a*b* color system as shown in FIG. 12, this target value T' must be moved to the position within the range of color reproduction. In this case, the target value T' is moved in the direction toward achromatic color, and the target value T corresponding to the T' is calculated as shown in FIG. 14 in the case that the coordinate of the point where the T' crosses with the boundary of the range of color reproduction when T' is moved toward achromatic color as shown in FIG. 13 is used as a target value.

This target value T' need not always be moved to the boundary. It should be moved within the range of color reproduction. Further, for the sake of explanation, an example of two dimensions of C×M is shown. Actually, Three dimensions of C×M×Y are used. Values for C, M and Y must be calculated one by one where each LUT input point of 33×33×33 points of L*a*b* is used as a target value T'.

L*a*b*→CMY LUT is obtained in the manner described above.

(Step S13)

With the printing machine, 21-level gray patches consisting of the same amount of CMYs for the levels of 0, 12, 25, 38, 51, 64, 76, 89, 102, 115, 128, 140, 153, 166, 178, 191, 204, 217, 229, 242, and 255 including white and black is output, and is measured by a calorimeter to obtain value L*a*b*.

(Step S14)

The output values of CMY are calculated with the values of L*a*b* color system obtained from the gray patch of the printing machine and the L*a*b*→CMY LUT of the color proof printer in order to make gradation correction curves of CMY.

Assume, for example, that values L*a*b* in color system obtained in Step S13 for one point of gray patch are L*=57.0, a*=5.3, b*=3.6. Then input grid points for the L*a*b*: 33×33×33→CMY LUT and distances for the input points are decided as L*: 57.0/100×32=18.2. So the first point L1 of L*, distance DL1 of L1, the second point L2 of L*, and distance DL2 of L2 are L1=18, DL1=0.2, L2=19, and DL2=0.8.

a*: (5.3 +127)/255×32=16.6. So the first point a1 of a*, distance DL1 of a1, the second point a2 of a*, and distance Da2 of a2 are a1=16, Da1=0.6, a2=17, and Da2=0.4.

b*: (3.6 +127)/255×32=16.4. So the first point b1 of b*, distance DL1 of b1, the second point b2 of b*, and distance Db2 of b2 are b1=16, Db1=0.4, b2=17 and Db2=0.6.

Assume that the CMY value of L*2 points (L1, L2)×a* 2 points (a1, a2)×b*2 points (b1, b2)=8 points from L*a*b*: 33×33×33→CMY LUT are:

CL1a1b1, CL1a1b2, CL1a2b1, CL1a2b2,
CL2a1b1, CL2a1b2, CL2a2b1, CL2a2b2,
ML1a1b1, ML1a1b2, ML1a2b1, ML1a2b2,
ML2a1b1, ML2a1b2, ML2a1b1, ML2a2b2,
YL1a1b1, YL1a1b2, YL1a2b1, YL1a2b2,
YL2a1b1, YL2a1b2, YL2a2b1, YL2a2b2,

Then the CMY values for L*=57.0, a*=5.3, b*=3.6 can be expressed as fyollows:

C=DL2×Da2×Db2×CL1a1b1
 +DL2×Da2×Db1×CL1a1b2
 +DL2×Da1×Db2×CL1a2b1
 +DL2×Da1×Db1×CL1a2b2
 +DL1×Da2×Db2×CL2a1b1
 +DL1×Da2×Db1×CL2a1b2

+DL1×Da1×Db2×CL2a2b1
+DL1×Da1×Db1×CL2a2b2
M=DL2×Da2×Db2×ML1a1b1
+DL2×Da2×Db1×ML1a1b2
+DL2×Da1×Db2×ML1a2b1
+DL2×Da1×Db1×ML1a2b2
+DL1×Da2×Db2×ML2a1b1
+DL1×Da2×Db1×ML2a1b2
+DL1×Da1×Db2×ML2a2b1
+DL1×Da1×Db1×ML2a2b2
Y=DL2×Da2×Db2×YL1a1b1
+DL2×Da2×Db1×YL1a1b2
+DL2×Da1×Db2×YL1a2b1
+DL2×Da1×Db1×YL1a2b2
+DL1×Da2×Db2×YL2a1b1
+DL1×Da2×Db1×YL2a1b2
+DL1×Da1×Db2×YL2a2b1
+DL1×Da1×Db1×YL2a2b2

Figure 7:
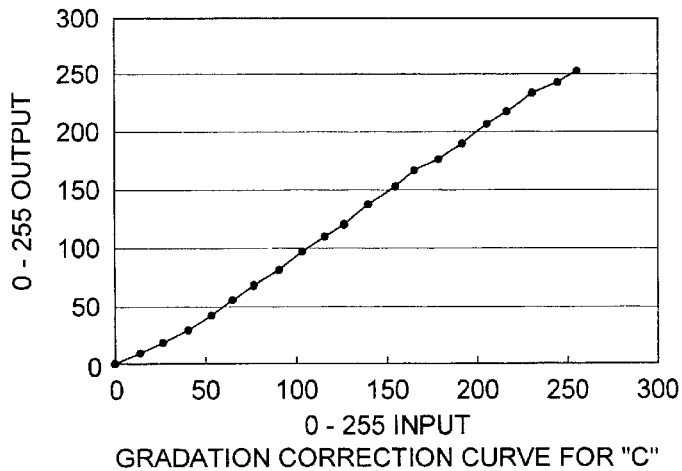
FIGS. 7(a), 7(b) and 7(c) are diagrams representing the gradation correction curve of each color as output values for input values of each of Y, M and C according to the present embodiment.
Figure 7:
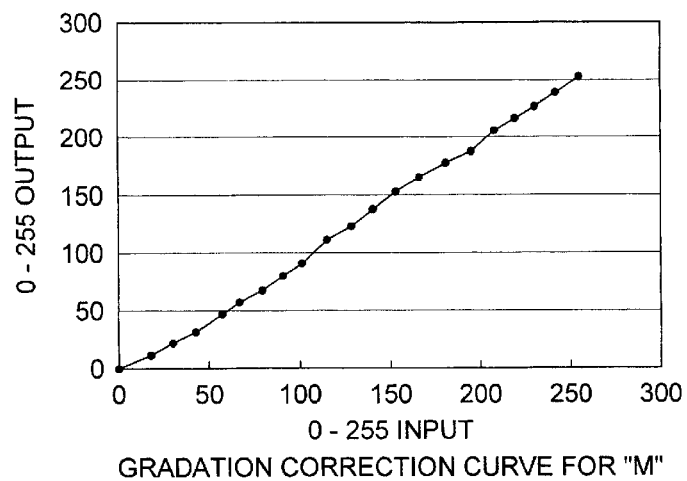
Figure 7:
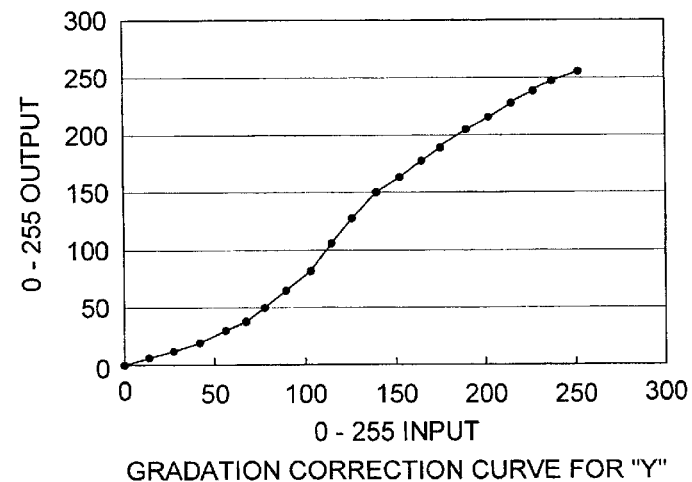

As described above, the calculation is made on the $L^*a^*b^*$ at 21 points obtained from the gray patch of the printing machine and The output value of each of the C, M and Y are found out, thereby creating a gradation correction curve of each of the C, M and Y as shown in FIG. 7.

(Step S15)

Further, a gradation correction curve of K is created. First, the printing machine outputs the patch of single K color (0, 32, 64, 96, 128, 159, 191, 223 and 255) to get values of $L^*$. The $L^*$ values are assumed as Lin1, Lin2, Lin3, Lin4, Lin5, Lin6, Lin7, Lin8 and Lin9.

Then the color proof printer outputs the patch of single K color (0, 32, 64, 96, 128, 159, 191, 223 and 255) to get values of $L^*$. The $L^*$ values are assumed as Lout1, Lout2, Lout3, Lout4, Lout5, Lout6, Lout7, Lout8 and Lout9.

Figure 15:
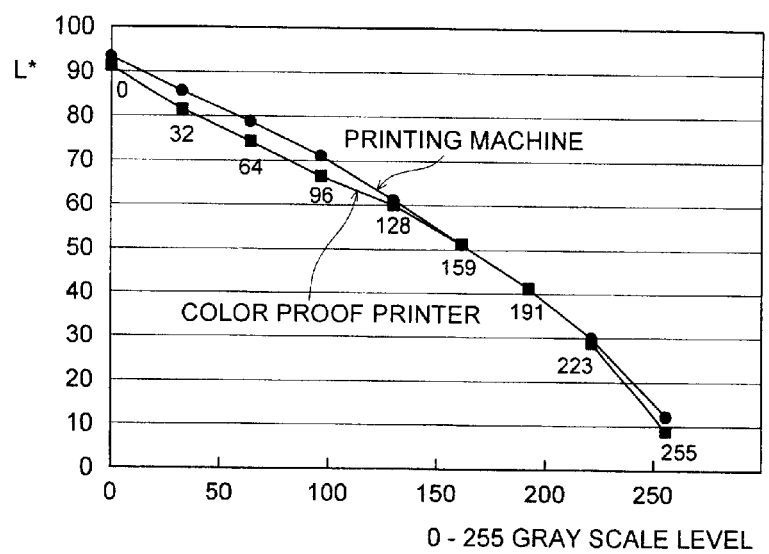
FIG. 15 is a diagram representing the L* values of nine single K color steps of the printing machine and color proof printer in the present embodiment.
Figure 16:
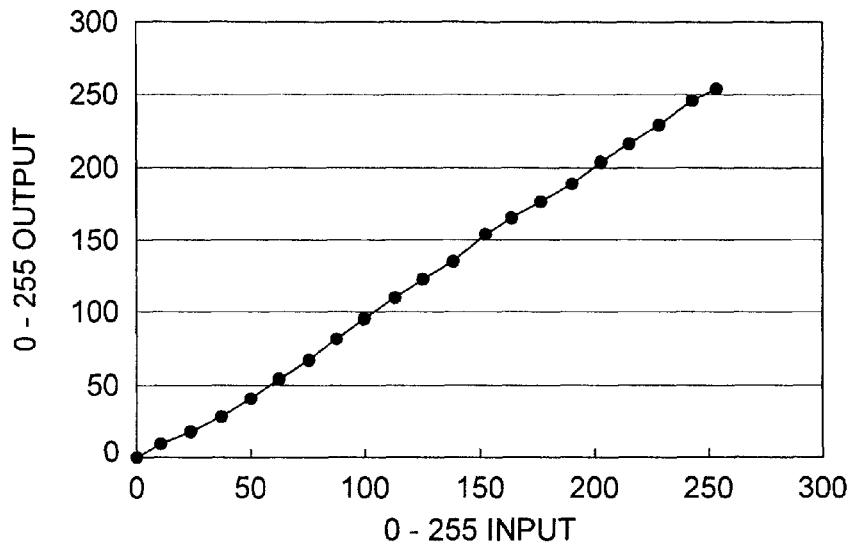
FIG. 16 is a diagram representing the K gradation correction curve as output values for input values of K in the present embodiment.

The gradation correction curve of K shown in FIG. 16 is created (S15) by obtaining the value K of the color proof printer from the above-mentioned Lin1 to Lin9 and Lout1 to Lout9 as shown in FIG. 15 in such a way that the lightness data $L^*$ of input K of printing machine is reproduced.

Actually in this gradation correction curve calculation, the white $L^*$ is different between the output of the printing machine and that of the color proof printer. Accordingly, the curve is so generated that the white (0) is not corrected to seek matching of $L^*$. Further, when the minimum lightness of the K of the output from the printing machine is smaller than that of the color proof printer, then lightness $*L$ cannot be reproduced. Accordingly, a curve is generated in such a way as to reproduce the minimum lightness of K of the color proof printer. Further, in the present embodiment, the output value is 255 for the input value 255 of gradation correction curve of K. This is intended to improve the reproduction of letters by outputting the K in a solid filled form.

(Step S16)

The gradation correction curves of C, M, Y and K are used to correct the C, M, Y and K of image data for the printing machine to output with the color proof printer.

As described above, according to the present embodiment, a gradation correction curves of C, M and Y are generated from the gray patches of C, M and Y of the printing machine and color patches of C, M and Y of the proof printer. The gradation correction curve of K is obtained from the gray patches of K of the printing machine and color proof printer. And the C, M, Y and K of image data for the printing machine are output from the color proof printer in the respective amounts by the conversion of the gradation correction alone, using the gradation correction curves of the C, M, Y and K. These steps provide the printed output with high color reproduction of printing machine on gray resulting from overlapping of C, M and Y, and the entire color tone of the image.

Program software is generated in such a way that the steps of the color adjustment method according to the present embodiment shown in FIG. 1 are implemented by a computer. This program software can be stored in a computer-readable recording medium.

What is claimed is:

1. A color adjustment method for applying to a first color image output apparatus and a second color image output apparatus, said method comprising:

generating a gradation correction curve for each color in such a way that values of one of (i) four colors, cyan C, magenta M, yellow Y and black K and (ii) three colors, C, M and Y to be input into the first color image output apparatus are input values for the gradation correction curve, while values of one of (i) four colors, C, M, Y and K and (ii) three colors, C, M and Y to be input into the second color image output apparatus are output values for the gradation correction curve; and performing conversion of C, M, Y and K values for an image data with the gradation correction curve so that the second color image output apparatus reproduce colors outputted by the first color image output apparatus;

wherein the gradation correction curve is generated based on a first color chart outputted from the first color image output apparatus and a second color chart outputted from the second color image output apparatus, and wherein the first color chart comprises at least one gray color outputted by overprinting three fundamental colors C, M and Y in equal amounts, and the second color chart comprises a lattice-shaped color chart made by combining plural color levels for each of the three fundamental colors C, M, and Y.

2. A program for implementing a color adjustment method on a computer, the color adjustment method for applying to a first color image output apparatus and a second color image output apparatus, the color adjustment method comprising:

generating a gradation correction curve for each color in such a way that values of one of (i) four colors, cyan C, magenta M, yellow Y and black K and (ii) three colors, C, M and Y to be input into the first color image output apparatus are input values for the gradation correction curve, while values of one of (i) four colors, C, M, Y and K and (ii) three colors, C, M and Y to be input into the second color image output apparatus are output values for the gradation correction curve; and performing conversion of C, M, Y and K values for an image data with the gradation correction curve so that the second color image output apparatus reproduce colors outputted by the first color image output apparatus;

wherein the gradation correction curve is generated based on a first color chart outputted from the first color image output apparatus and a second color chart outputted from the second color image output apparatus, and wherein the first color chart comprises at least one gray color outputted by overprinting three fundamental colors C, M and Y in equal amounts, and the second color chart comprises a lattice-shaped color chart made by combining plural color levels for each of the three fundamental colors C, M, and Y.

3. A computer readable memory medium for storing a program for implementing a color adjustment method on a computer, the color adjustment method for applying to a first color image output apparatus and a second color image output apparatus, the color adjustment method comprising:

generating a gradation correction curve for each color in such a way that values of one of (i) four colors, cyan C, magenta M, yellow Y and black K and (ii) three colors, C, M and Y to be input into the first color image output apparatus are input values for the gradation correction curve, while values of one of (i) four colors, C, M, Y and K and (ii) three colors, C, M and Y to be input into the second color image output apparatus are output values for the gradation correction curve; and performing conversion of C, M, Y and K values for an image data with the gradation correction curve so that the second color image output apparatus reproduce colors outputted by the first color image output apparatus;

wherein the gradation correction curve is generated based on a first color chart outputted from the first color image output apparatus and a second color chart outputted from the second color image output apparatus, and wherein the first color chart comprises at least one gray color outputted by overprinting three fundamental colors C, M and Y in equal amounts, and the second color chart comprises a lattice-shaped color chart made by combining plural color levels for each of the three fundamental colors C, M, and Y.

* * * * *